(12) United States Patent
Wilson

(10) Patent No.: US 12,117,086 B2
(45) Date of Patent: Oct. 15, 2024

(54) MECHANICAL FAUCET UTILIZING HYDRAULIC DAMPERS FOR TIMING

(71) Applicant: B/E Aerospace, Inc., Winston Salem, NC (US)

(72) Inventor: Robert Wilson, Massillon, OH (US)

(73) Assignee: B/E AEROSPACE, INC., Winston Salem, NC (US)

( * ) Notice: Subject to any disclaimer, the term of this patent is extended or adjusted under 35 U.S.C. 154(b) by 161 days.

(21) Appl. No.: 17/891,977

(22) Filed: Aug. 19, 2022

(65) Prior Publication Data

US 2024/0060572 A1     Feb. 22, 2024

(51) Int. Cl.
*F16K 21/12*     (2006.01)
*F16K 11/074*     (2006.01)

(52) U.S. Cl.
CPC ............ *F16K 21/12* (2013.01); *F16K 11/074* (2013.01)

(58) Field of Classification Search
CPC .......... F16K 21/12; F16K 21/10; F16K 21/04; F16K 11/074; F16K 19/006; F16K 31/605; F16K 11/0746; B64D 11/02; Y10T 137/9464
See application file for complete search history.

(56) References Cited

U.S. PATENT DOCUMENTS

| | | | |
|---|---|---|---|
| 2,324,946 A * | 7/1943 | Molloy | F16K 21/10 251/50 |
| 4,457,452 A * | 7/1984 | Symmons | F16K 11/0746 137/636.4 |
| 4,768,553 A * | 9/1988 | Marx | F16K 21/06 251/20 |
| 4,936,347 A | 6/1990 | Oracz et al. | |
| 4,991,819 A * | 2/1991 | Laube | F16K 21/10 251/35 |

(Continued)

FOREIGN PATENT DOCUMENTS

| | | |
|---|---|---|
| CN | 110748676 | 2/2020 |
| CN | 215371160 | 12/2021 |

(Continued)

OTHER PUBLICATIONS

European Patent Office, European Search Report dated Jan. 2, 2024 in Application No. 23191082.9.

*Primary Examiner* — Craig J Price
*Assistant Examiner* — Andrew J Rost
(74) *Attorney, Agent, or Firm* — SNELL & WILMER L.L.P.

(57) ABSTRACT

A faucet includes a faucet housing defining a mixing chamber and a dry chamber, a valve assembly, and a damper assembly. The valve assembly includes a main shaft having a first end and a second end, a knob coupled to the first end, a mixing plate coupled to the second end, a main seal coupled to the main shaft, and a first biasing member disposed around the main shaft. The first end is disposed within the mixing chamber and the second end is disposed within the dry chamber. The damper assembly includes an outer cylinder disposed within the dry chamber, a piston extending at least partially into the outer cylinder, and a second biasing member disposed within the outer cylinder. The piston has an interference surface configured to contact the knob, and the second biasing member is configured to bias the piston.

19 Claims, 6 Drawing Sheets

(56) References Cited

U.S. PATENT DOCUMENTS

| | | | | |
|---|---|---|---|---|
| 5,295,654 | A | * | 3/1994 | Laube ................ F16K 21/10 |
| | | | | 251/35 |
| 5,427,351 | A | * | 6/1995 | Korfgen .............. F16K 21/10 |
| | | | | 251/35 |
| 6,286,533 | B1 | | 9/2001 | Goncze et al. |
| 7,134,451 | B1 | * | 11/2006 | Malapanes .......... F16K 31/535 |
| | | | | 251/35 |
| 7,694,935 | B2 | | 4/2010 | Wang |
| 2006/0202138 | A1 | * | 9/2006 | Yeh .................... F16K 21/12 |
| | | | | 251/15 |
| 2009/0044865 | A1 | * | 2/2009 | Migliore ............ F16K 11/0856 |
| | | | | 137/1 |

FOREIGN PATENT DOCUMENTS

| | | |
|---|---|---|
| EP | 2580506 | 7/2015 |
| EP | 2998623 | 3/2016 |
| EP | 4043764 | 8/2022 |

* cited by examiner

MECHANICAL FAUCET UTILIZING HYDRAULIC DAMPERS FOR TIMING

FIELD

The present disclosure relates to faucets and, in particular, to mechanical faucets using hydraulic dampers.

BACKGROUND

Aircraft lavatory faucets provide potable water for handwashing. Mechanical faucets currently in the market utilize the flow of the water through the faucet as a means for controlling the timing. This can make the faucet susceptible to inconsistent water flow timing and premature corrosion due to the unlimited variations in water quality can lead to introduction of Foreign Object Debris (FOD) from the various landing locations and the respective water source.

SUMMARY

A faucet is disclosed herein. In accordance with various embodiments, the faucet includes a faucet housing defining a mixing chamber and a dry chamber, a valve assembly, and a damper assembly. The valve assembly includes a main shaft having a first end and a second end, a knob coupled to the first end, a mixing plate coupled to the second end, a main seal coupled to the main shaft, and a first biasing member disposed around the main shaft. The first end is disposed within the mixing chamber and the second end is disposed within the dry chamber. The damper assembly includes an outer cylinder disposed within the dry chamber, a piston extending at least partially into the outer cylinder, and a second biasing member disposed within the outer cylinder. The piston has an interference surface configured to contact the knob, and the second biasing member is configured to bias the piston.

In various embodiments, the faucet further includes a first stopper disposed between the mixing chamber and the dry chamber wherein the damper assembly is isolated from fluid received by the mixing chamber.

In various embodiments, the first stopper defines a fluid pathway, the fluid pathway allowing fluid to flow from the mixing chamber to an outlet of the faucet.

In various embodiments, the faucet further includes a second stopper disposed in the dry chamber.

In various embodiments, the main shaft is configured to extending through the first stopper and the second stopper.

In various embodiments, the outer cylinder is disposed between the first stopper and the second stopper, and the piston is configured to extend through the second stopper.

In various embodiments, the faucet further includes a plurality of damper assemblies.

In various embodiments, the knob is configured to overlap an outer surface of the faucet housing.

In various embodiments, in a closed position, the main seal is configured to seal the fluid pathway of the first stopper. The knob is configured to be translated along a longitudinal axis in response to an applied force, and wherein, in an open position, the knob is configured to translate the main shaft in a same longitudinal direction such that the main seal coupled to the main shaft is translated away from the fluid pathway.

In various embodiments, in the open position, the knob is configured to translate the damper assembly in response to the knob making contact with the interference surface of the piston such that the piston moves further into the outer cylinder biasing the second biasing member of the damper assembly.

In various embodiments, when the valve assembly is in the open position, the fluid pathway defined by the first stopper fluidly connects the mixing chamber and the outlet.

In various embodiments, when transitioning from the open position to the closed position, the damper assembly controls the timing of the fluid flow.

A faucet system for an aircraft lavatory is also disclosed herein. In accordance with various embodiments, the faucet system includes a potable water source and a faucet having a faucet housing, a valve assembly, a damper assembly. The faucet housing defines an inlet and an outlet. The inlet coupled to the potable water source. The valve assembly is disposed at least partially within the faucet housing. the valve assembly includes a main shaft having a first end and a second end, a knob coupled to the first end, a mixing plate coupled to the second end, and a main seal coupled to the main shaft. The damper assembly is disposed within the faucet housing. The damper assembly includes an outer cylinder and a piston extending at least partially into the outer cylinder.

In various embodiments, the faucet system further includes a first stopper disposed within the faucet housing. The first stopper defines a fluid pathway and isolates the damper assembly from fluid received by the inlet. The fluid pathway allows fluid to flow from the inlet to the outlet of the faucet.

In various embodiments, the inlet includes a plurality of apertures configured to direct a hot fluid received from the potable water source separately from a cold fluid received from the potable water source.

In various embodiments, the mixing plate is configured to proportion the hot fluid and the cold fluid.

In various embodiments, when the valve assembly is in an open position, the fluid pathway defined by the first stopper fluidly connects the inlet and the outlet.

In various embodiments, the damper assembly controls the timing of the fluid flow when transitioning from the open position to a closed position.

In various embodiments, in the closed position, the main seal is configured to seal the fluid pathway of the first stopper The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface lines may be used throughout the figures to denote different parts but not necessarily to denote the same or different materials. Throughout the present disclosure, like reference numbers denote like elements. Accordingly, elements with like element numbering may be shown in the figures but may not necessarily be repeated herein for the sake of clarity.

Disclosed herein, according to various embodiments, is a faucet, particularly a mechanical faucet utilizing a hydraulic damper to control the faucet timing. By utilizing a hydraulic damper, the timing medium is controlled with little to no variation and no risk of FOD on the timing device. For instance, the dampers may be isolated from a water path of the faucet. Further, the dampers are linear and provide resistance only during the motion to close the valve, with a double fault to prevent contamination of the damper oil into the water path. This results in a faucet with less manufacturing concerns related to tolerance as the timing device (e.g., the dampers) will maintain consistent performance over its life cycle. Further, such a configuration may also lead to an increased life cycle over existing mechanical faucets as FOD, scale, or corrosion build-up as a result of the water will have no impact on the timing device which is isolated from the water path.

Although details and examples are included herein pertain to implementing the faucet in an aircraft lavatory, the present disclosure is not necessarily so limited, and thus aspects of the disclosed embodiments may be adapted for performance in a variety of other industries. As such, numerous applications of the present disclosure may be realized.

Figure 1:
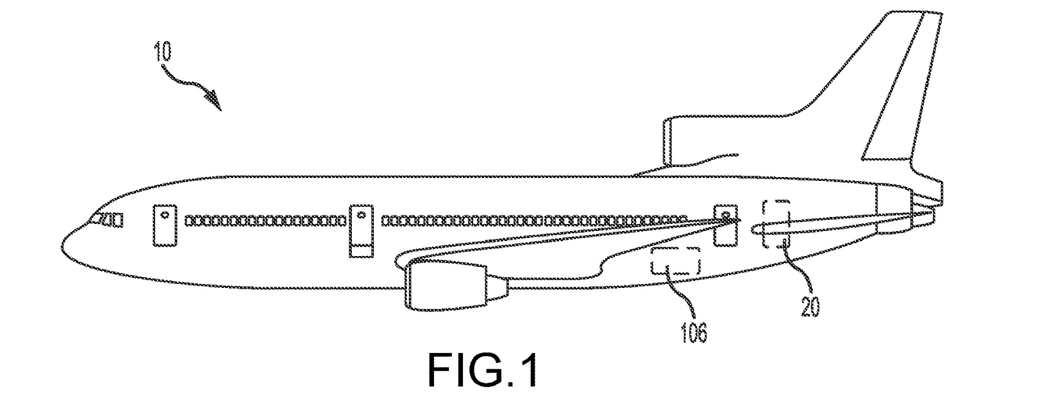
FIG. 1 illustrates an aircraft, in accordance with various embodiments.
Figure 2:
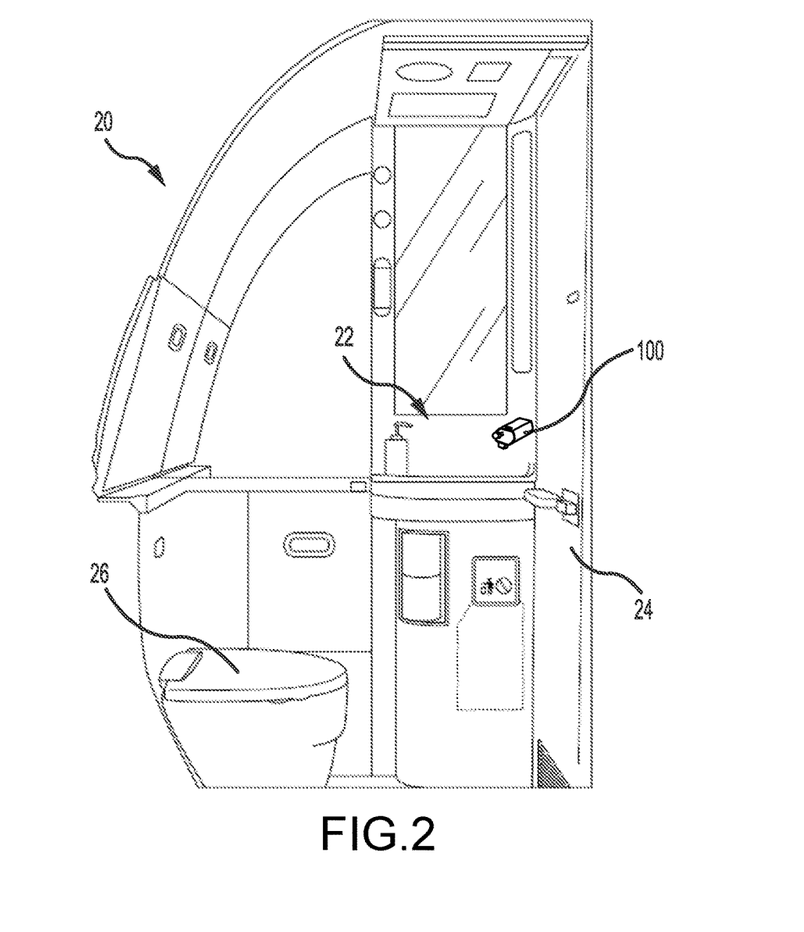
FIG. 2 illustrates an aircraft lavatory having a mechanical faucet, in accordance with various embodiments.

Referring now to FIGS. 1 and 2, an aircraft 10 may include aircraft lavatory 20. The aircraft lavatory 20 may include a washbasin (e.g., a sink) 22, a door 24, and a toilet 26, among other features. The washbasin 22 includes a faucet 100.

Figure 3A:
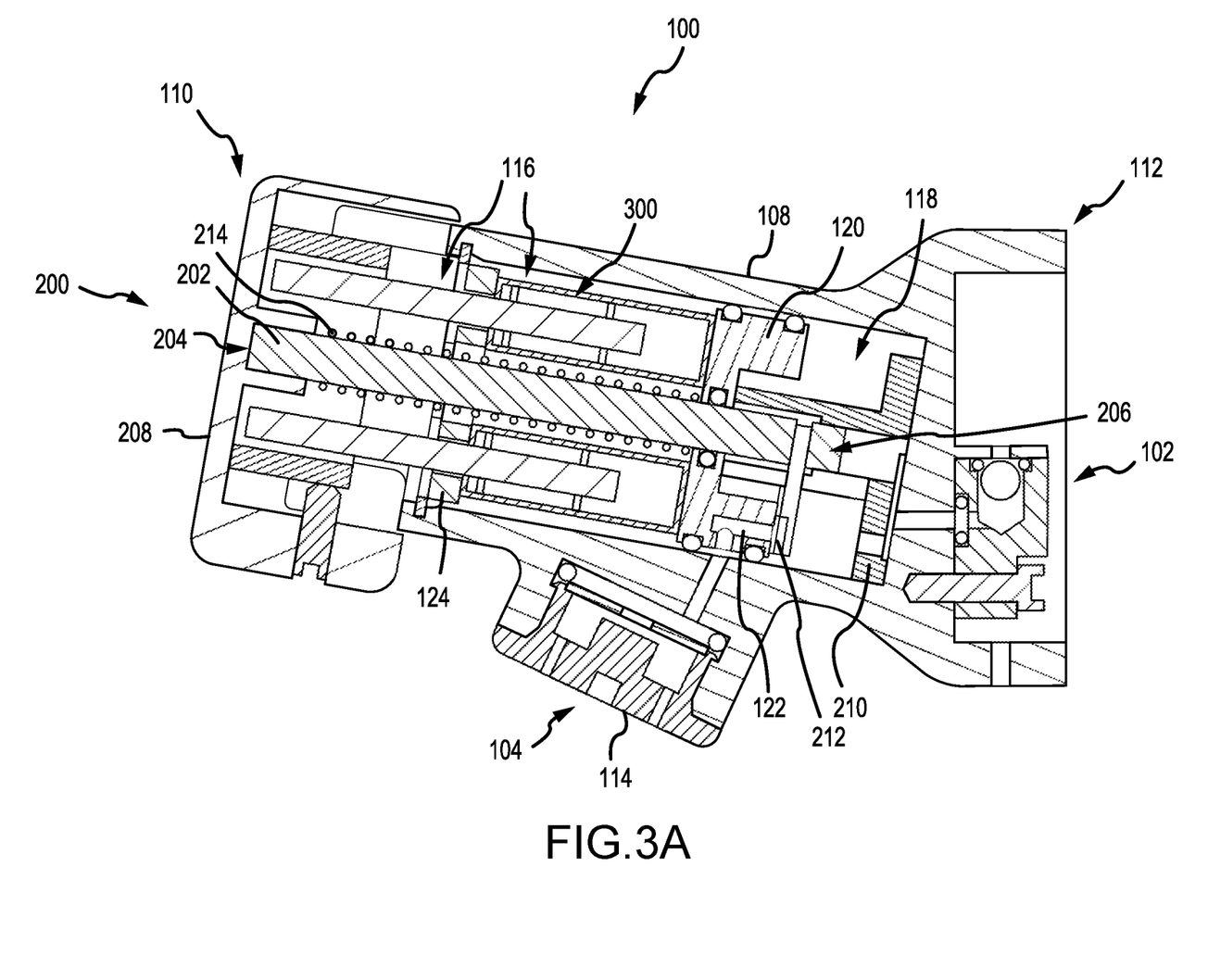
FIGS. 3A and 3B illustrate cross-sectional side views of a faucet in a closed position and an open position, respectively, in accordance with various embodiments.
Figure 3B:
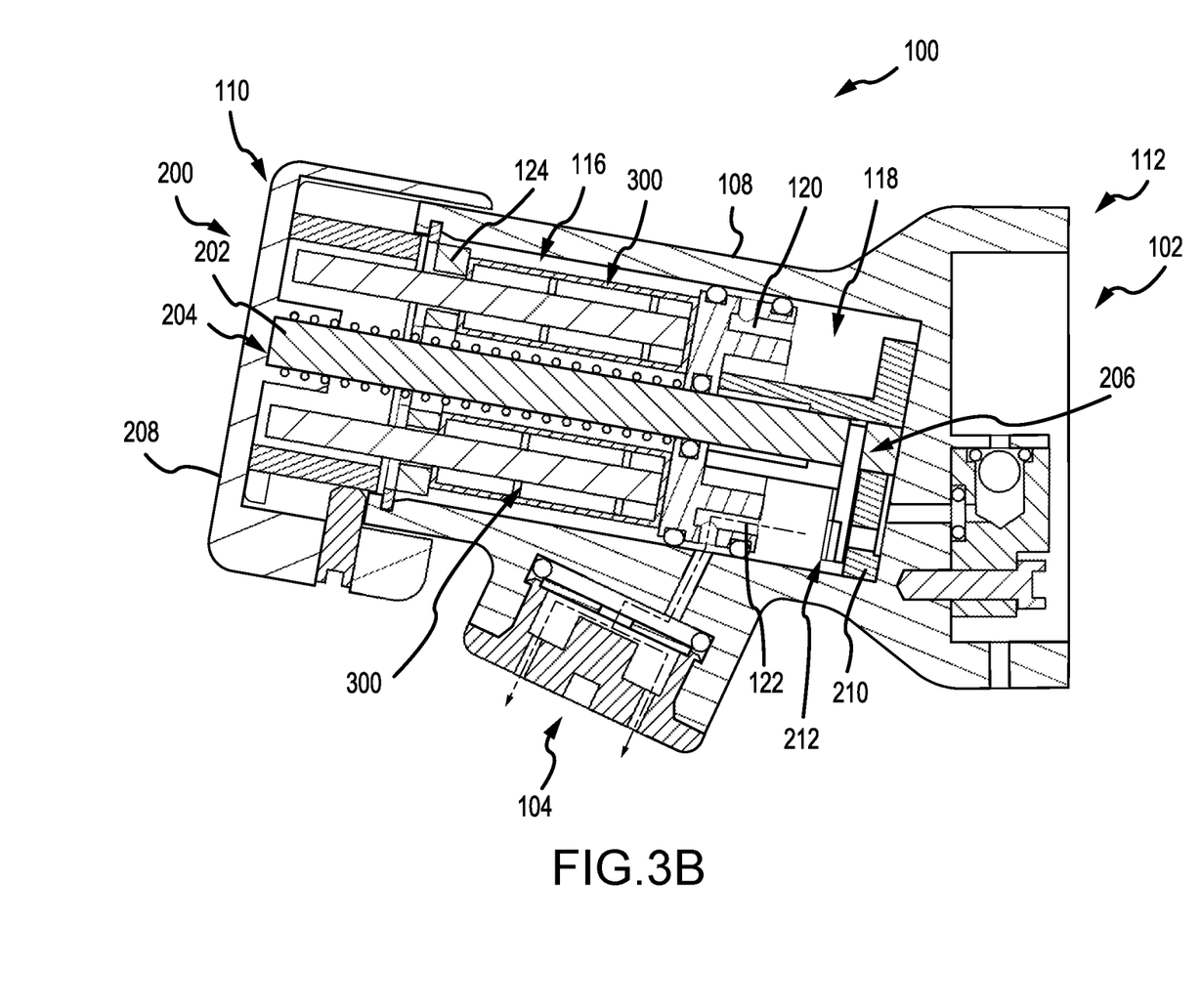

With reference to FIGS. 3A and 3B, a cross section view of the valve open and closed, respectively, of faucet 100 are illustrated. In accordance with various embodiments, faucet 100 includes an inlet 102 and an outlet 104. Faucet 100 may receive water from a potable water source 106 (FIG. 1) located on aircraft 10. Faucet 100 receives water via inlet 102 and outputs the water via outlet 104. In various embodiments, a faucet housing 108, having a first end 110 and a second end 112 opposite the first end 110, may define the inlet 102 and the outlet 104. For example, the inlet 102 may be located at the second end 112 and the outlet 104 may be located in between the first end 110 and the second end 112, as shown in FIGS. 3A and 3B. Outlet 104 may include an aerator 114 coupled to faucet housing 108. In various embodiments, a coupler (not shown) may be coupled to faucet 100 at inlet 102. Coupler may be coupled to faucet housing 108 at inlet 102. The coupler may be fluidly coupled to a potable water supply line (e.g., a conduit fluidly connected to potable water source 106 (FIG. 1), via a threaded engagement. In this regard, coupler may be configured to allow faucet 100 to be fluidly coupled to current potable water supply lines.

The faucet housing 108 may further comprise a dry chamber 116 and a mixing, or wet, chamber 118. For instance, the mixing chamber 118 is configured to receive water, or fluid, from the inlet 102 and is located adjacent the dry chamber 116. The dry chamber 116 is configured to house mechanical components of the faucet 100 and remain isolated from the received fluid. In various embodiments, the faucet housing 108 may comprise a first stopper 120 configured to separate the dry chamber 116 from the mixing chamber 118. The first stopper 120 includes a fluid pathway 122 configured to allow flow of the received fluid in the mixing chamber 118 to flow to the outlet 104 when the faucet 100 is in use (e.g., the faucet 100 is in an open position), as described further herein.

The faucet housing 108 may further comprise a second stopper 124. The second stopper 124 may be disposed within the dry chamber 116. The second stopper 124 may be positioned closer to the first end 110 of the faucet housing 108 than the first stopper 120. The second stopper 124 is configured to position and secure the first stopper 120, a mixing plate, and at least one damper assembly, as described herein.

Referring still to FIGS. 3A and 3B, a valve assembly 200 includes a main shaft 202 having a first end 204 and a second end 206 opposite the first end 204. The main shaft 202 may be disposed within the faucet housing 108 along a longitudinal axis (e.g., from the first end 110 to the second end 112 of the faucet 100). For instance, the first end 204 and the second end 206 of the main shaft 202 correspond with the first end 110 and the second end 112 of the faucet housing 108. The main shaft 202 may be configured to extend through the first stopper 120 such that the first end 204 is in the dry chamber 116 and the second end 206 is in the mixing chamber 118. The main shaft 202 may further be configured to extend through the second stopper 120.

The main shaft 202 is coupled to a knob 208 at the first end 204. The knob 208 may be disposed at the first end 110 of the faucet housing 108 such that the knob 208 functions as a cap to the faucet 100 (e.g., the knob 208 is configured to overlap an outer surface of the faucet housing 108). The main shaft 202 is further coupled to a mixing plate 210 at the second end 206. The mixing plate 210 may be disposed within the faucet housing 108 toward the second end 112 of the faucet housing 108 (e.g., the mixing plate 210 is disposed within the mixing chamber 118). The main shaft 202 rotates about the longitudinal axis of the valve assembly 200 (during operation/actuation of the valve assembly 200). Accordingly, the main shaft 202 is coupled to the knob 208 and the mixing plate 210 such that when the knob 208 is rotated, the main shaft 202 rotates and in turn, rotates the mixing plate 210, as will be further discussed herein. In various embodiments, the main shaft 202 is configured to be coupled to the mixing plate 210 such that the main shaft 202 may slide longitudinally within the mixing plate 210 when the knob 208 is pressed.

The valve assembly 200 further includes a main seal 212. The main seal 212 is coupled to the main shaft 202 toward the second end 206 of the main shaft 202 (e.g., the main seal 212 is disposed within the mixing chamber 118). The main seal 212 is configured to seal (e.g., block, prevent flow, etc.) the fluid pathway 122 from the mixing chamber 118 when the faucet 100 is not in use (e.g., the faucet 100 is in a closed position). For instance, the main seal 212 may comprise a resilient, elastomeric material such as, for example, rubber, synthetic rubber, silicone, and/or the like. In this regard, the main seal 212 may deform in response to contact with the first stopper 120. The main seal 212 is configured to move with the main shaft 202. Accordingly, when the knob 208 is pressed toward the second end 112 of the faucet housing 108, the main shaft 202 translates in the same direction along the longitudinal axis and in turn, translates the main seal 212 similarly and opens the fluid pathway 122. The second stopper 124 is configured to stop the knob 208 (e.g., limit the stroke of the knob 208) when the knob 208 is pressed such that the main shaft 202 and the main seal 212 only move a predetermined distance. In various embodiments, a set screw configured to hold the knob 208 onto the faucet body 108 is configured to stop the knob 208 (e.g., limit the stroke of the knob 208) when the knob 208 is pressed such that the main shaft 202 and the main seal 212 only move the predetermined distance.

The valve assembly 200 further includes a biasing member 214. The biasing member 214 is wrapped helically around the main shaft 202 along the longitudinal axis. Particularly, the biasing member may be disposed around a portion of the main shaft 202 disposed within the dry chamber 116. Translation of the knob 208 toward the second end 112 of the faucet housing 108 moves the main shaft 202 and compresses the biasing member 214 against the first stopper 120. Biasing member 214 is configured to bias the knob 208 away from the second end 112 of the faucet housing 108 and toward the first end 110 of faucet housing 108. For instance, biasing member 214 may be a coil spring (e.g., as illustrated in FIGS. 3A-3B), a leaf spring, a Belleville washer, etc.

In various embodiments, when the valve assembly 200 is in the closed position (e.g., see FIG. 3A), the main seal 212 may contact the first stopper 120. When the valve assembly 200 is in the closed position, the main seal 212 blocks the fluid pathway 122 formed in the first stopper 120 of faucet housing 108. When the valve assembly 200 is in the open position (e.g., see FIG. 3B), the biasing member 214 is in a compressed state due to the movement of the knob 208 and the main shaft 202, and the main seal 212 has moved away from the fluid pathway 122, thus allowing fluid (e.g., water) to flow from the mixing chamber 118 (received from the inlet 102, through the fluid pathway 122 and out through the outlet 104.

Figure 4A:
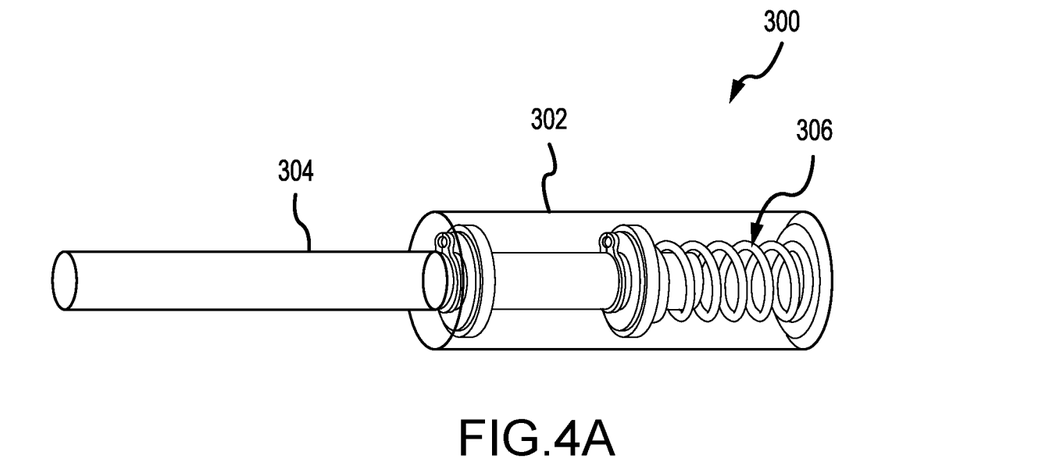
FIGS. 4A-4C illustrate perspective views of a damper assembly of the faucet of FIGS. 3A and 3B, in accordance with various embodiments.
Figure 4B:
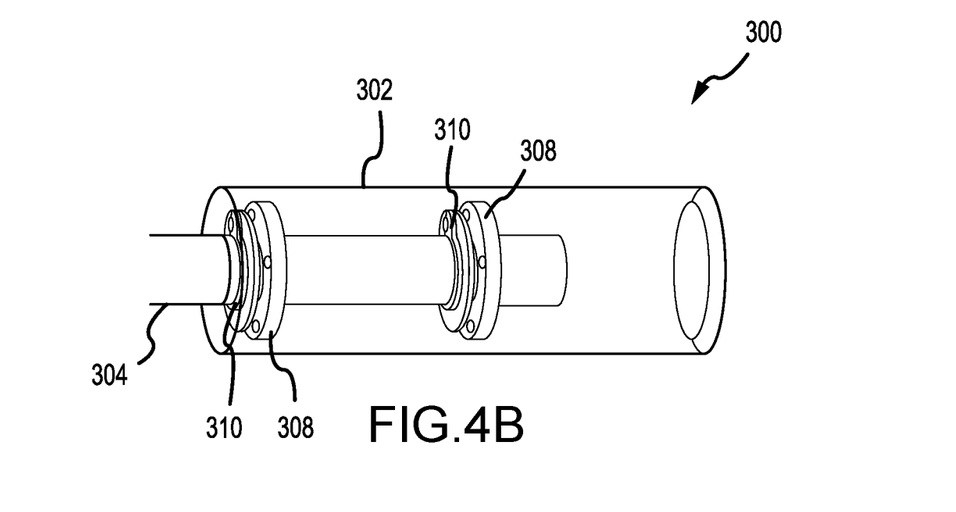
Figure 4C:
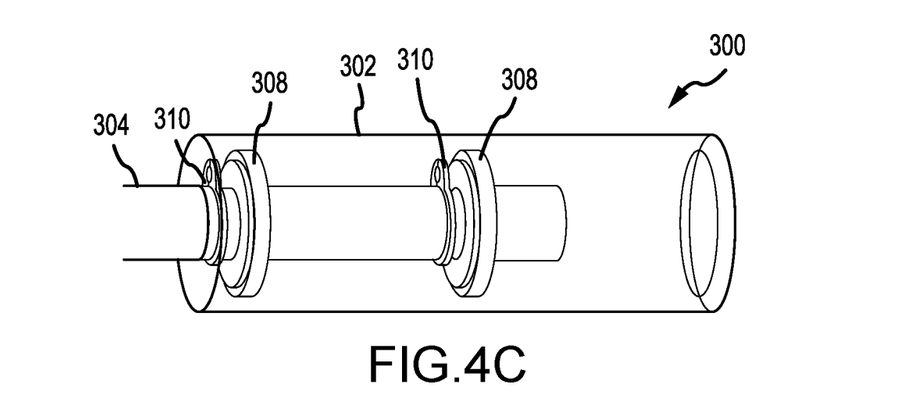

Referring still to in FIGS. 3A and 3B and with combined reference to FIGS. 4A-4C, in accordance with various embodiments, faucet 100 includes a damper assembly 300. The damper assembly 300 may be a hydraulic damper. The damper assembly 300 may be disposed within the faucet housing 108. Particularly, the damper assembly 300 is disposed within the dry chamber 116. In various embodiments, the faucet 100 may include one damper assembly 300. In various embodiments, the faucet 100 may include more than one damper assembly 300. For instance, the faucet 100 may include two damper assemblies 300 such that each damper assembly 300 is positioned on opposite sides of the main shaft 202, relative to the longitudinal axis.

The damper assembly 300 includes an outer cylinder 302, a piston 304 configured to translate relative to outer cylinder 302. The outer cylinder 302 is disposed along the longitudinal axis of the faucet housing 100. The outer cylinder 302 may extend at least a portion of a length of the dry chamber 116. For instance, the outer cylinder 302 may be disposed between the first stopper 120 and the second stopper 124. The outer cylinder 302 may be coupled to either or both of the first stopper 120 and the second stopper 124. The outer cylinder 302 may provide a second layer of isolation from the fluid received in the mixing chamber 118.

The piston 304 is at least partially disposed within the outer cylinder 302. The piston 304 is configured to extend from the outer cylinder 302, through the second stopper 124 and toward the first end 110 of the faucet housing 108. The piston 304 includes an interference surface configured to make contact with the knob 208 when the knob 208 is pressed, such that translation of knob 208 translates the piston 304 further into the outer cylinder 302 (e.g., in the direction along the longitudinal axis toward the second end 112). In response to a force being manually applied to the knob 208, the damper assembly 300 (and the valve assembly 200) translates to the open position. In various embodiments, when the knob 208 is pressed, such that translation of knob 208 translates the piston 304 further out of the outer cylinder 302 (e.g., in the direction along the longitudinal axis toward the second end 112). In response to a force being manually applied to the knob 208, the damper assembly 300 (and the valve assembly 200) translates to the open position.

The damper assembly 300 further includes a biasing member 306, at least one shim 308, and at least one retaining ring 310. The biasing member 306 is configured to bias the piston 304 toward the first end 110 of the faucet housing 108. Additionally, when the damper assembly 300 is compressed (e.g., in the open position), the at least one shim 308 is moved away from the retaining ring 310. A plurality of apertures disposed along a circumference of the at least one shim 308 are thus no longer blocked by the at least one retaining ring 310 and hydraulic fluid within the outer cylinder 302 may flow through the apertures. The hydraulic fluid may be a silicon oil or any other suitable fluid. As the biasing member 306 biases the piston 304 back toward the first end 110, the at least one shim 308 becomes pressed against the at least one retaining ring 310, thus covering the apertures and reducing the cross-section for the hydraulic fluid to flow through, which slows down the movement of the damper assembly 300. As discussed herein, the main seal 212 and thus the fluid flow from the inlet 102 to the outlet 104 responds to translation of the knob 208. Further, translation of the piston 304 out the outer cylinder 302 forces the knob 208 to translate back toward the first end 110. Accordingly, the timing of the flow of the fluid through the faucet 100 and out the outlet 104 may be controlled independent from the fluid flow itself. In other words, duration of the fluid flow is determined by the viscosity of the hydraulic fluid and the aperture size on the at least one shim 308. For instance, the fluid flow time may be controlled to be within 4-8 seconds. In other words, as illustrated, the damper assembly 300 moves freely in compression and controls water flow timing in extension.

In various embodiments, the damper assembly 300 may be configured to achieve a response inverse to the main embodiment described herein. For instance, in response to a compression stroke of the knob 208 (e.g., when the knob 208 is pressed) the damper assembly 300 is configured to extend. In other words, the biasing member 306 is compressed in the closed position and is released, or extended, in the open position. Accordingly, the timing would be controlled by a re-compression of the damper assembly 300 upon the return stroke (e.g., the knob 208 returns to its unpressed state). In other words, the damper assembly 300 moves freely in extension and controls water flow timing in compression.

Generally, the damper assembly 300 may be configured such that when the faucet 100 (e.g., the valve assembly 200) is being opened, the damper assembly 300 moves freely. When the faucet 100 (e.g., the valve assembly 200) is returning to the closed position, the damper assembly 300 controls the timing of the water flow. Accordingly, the direction the damper assembly travels in relation to the open/close position of the faucet is not limited to a particular direction.

Figure 5A:
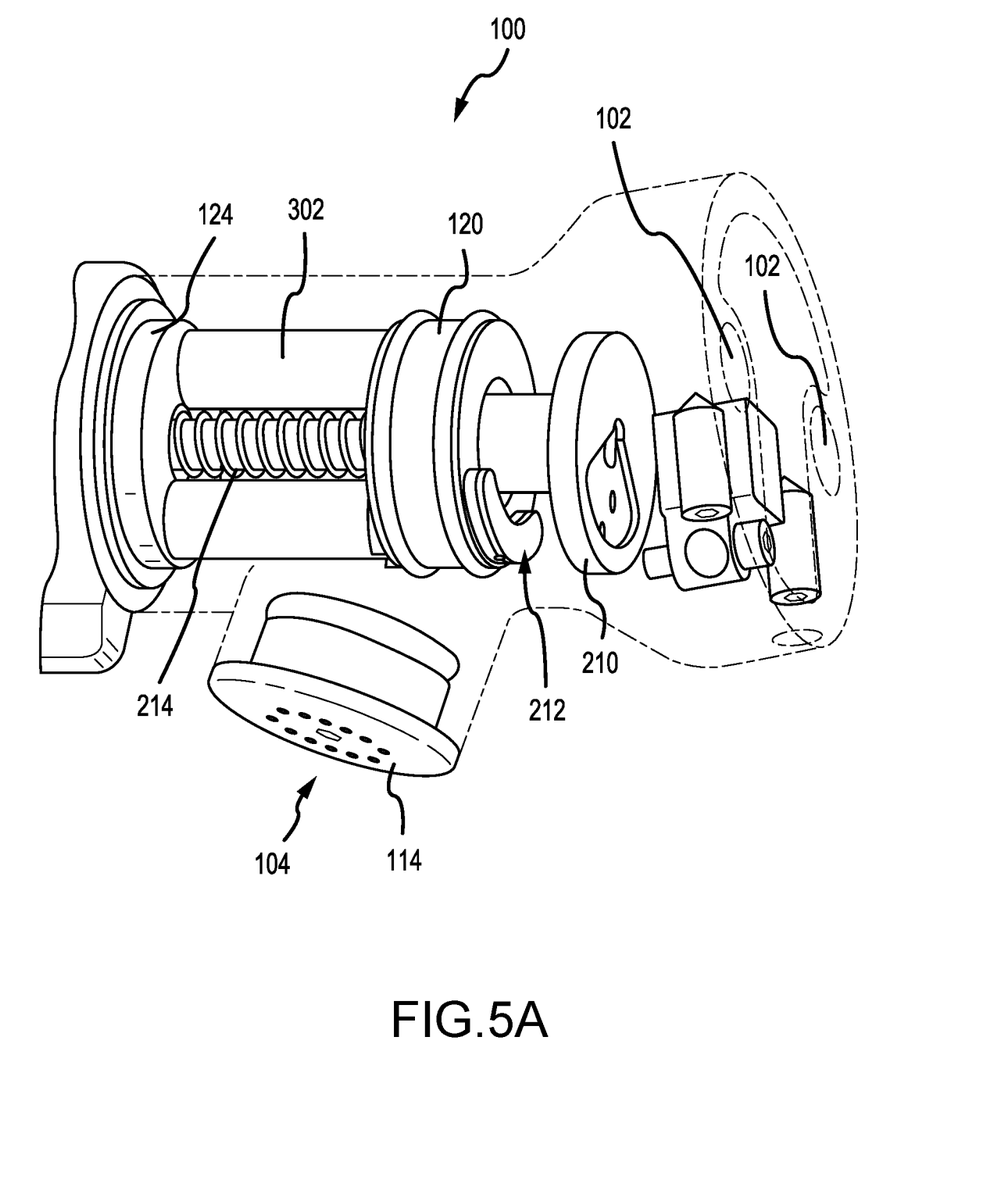
FIGS. 5A and 5B illustrate a perspective view and a cross sectional front view, respectively, of a faucet having a mixing plate for temperature adjustment, in accordance with various embodiments.
Figure 5B:
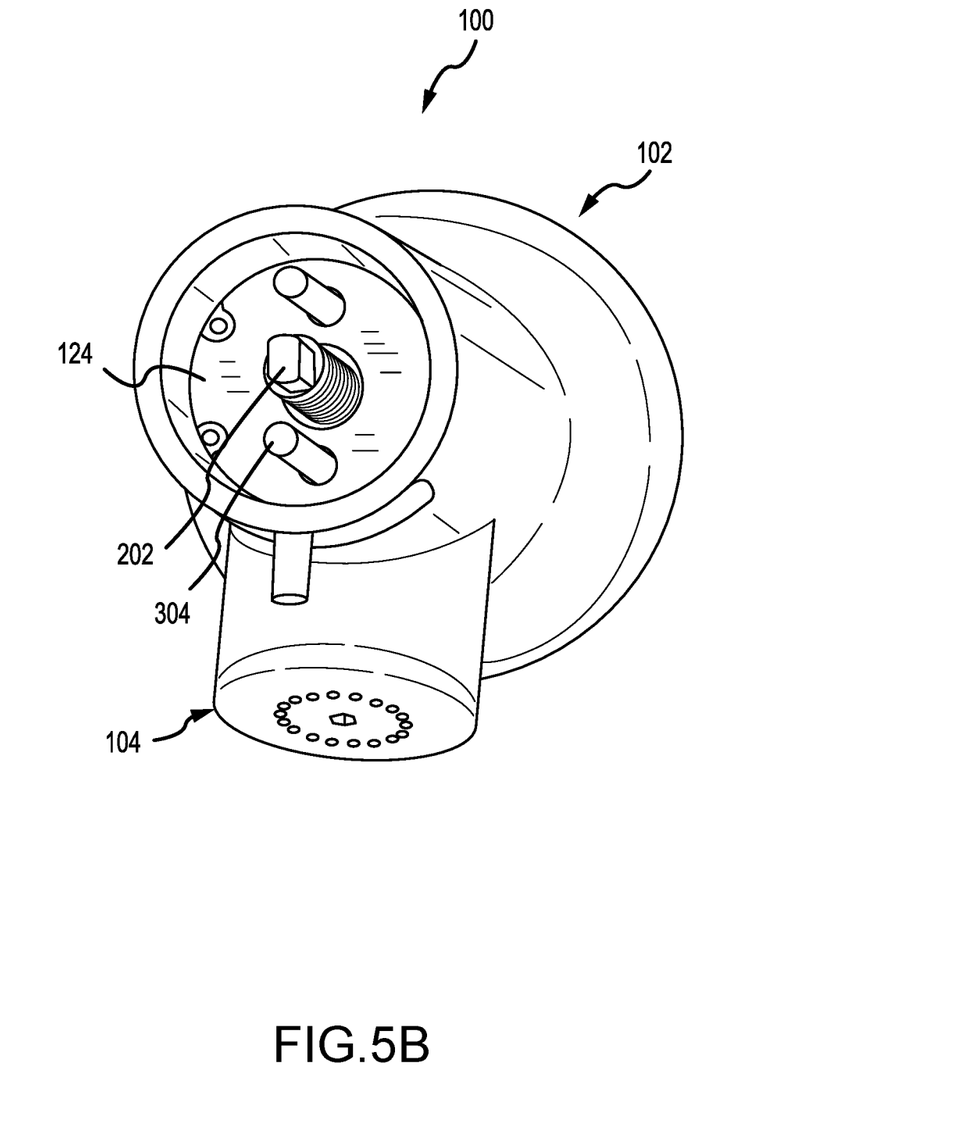

Referring now to FIGS. 5A and 5B, a temperature adjustment of the faucet 100 is illustrated, according to various embodiments. As described herein, the main shaft 202 is coupled to the knob 208 and the mixing plate 210 such that when the knob 208 and rotated, the main shaft 202 rotates, and in turn rotates the mixing plate 210. In other words, the main shaft 202 is keyed on both ends. Accordingly, the knob 208, the main shaft 202, and the mixing plate 210 are configured to allow for temperature adjustment. For instance, the inlet 102 may include two apertures configured to receive the water, or fluid from of the potable water source 106 (FIG. 1). The water that flows in may be directed such that the hot fluid and the cold fluid are received in separate apertures of the inlet 102. Further, the mixing plate 210 may be configured to block off one of the apertures of the inlet 102 (e.g., a hot water inlet). Accordingly, in response to the direction in which the knob 208 is turned (e.g., according to a user's preference), the mixing plate 210 is turned to either open or close, whether partially or completely, the corresponding aperture. In other words, the mixing plate 210 proportions the hot and cold water as the water comes into the mixing chamber 118. Thus, as shown in FIGS. 5A and 5B, such a temperature adjustment control is compatible with the damper assembly 300 described herein.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A faucet, comprising:
   a faucet housing defining a mixing chamber and a dry chamber;
   a valve assembly comprising:
      a main shaft having a first end and a second end, the first end disposed within the dry chamber and the second end disposed within the mixing chamber;
      a knob coupled to the first end;
      a mixing plate coupled to the second end;
      a main seal coupled to the main shaft; and
      a first biasing member disposed circumferentially around a portion of the main shaft within the dry chamber and configured to compress in response to a translation of the knob toward the second end; and
   a plurality of damper assemblies each comprising:
      an outer cylinder disposed within the dry chamber;
      a piston extending at least partially into the outer cylinder, the piston having an interference surface configured to contact the knob; and
      a second biasing member disposed within the outer cylinder and circumferentially around at least a portion of the piston, the second biasing member configured to bias the piston in an opposing direction of the translation of the knob.

2. The faucet of claim 1, further comprising a first stopper disposed between the mixing chamber and the dry chamber wherein the damper assembly is isolated from fluid received by the mixing chamber.

3. The faucet of claim 2, wherein the first stopper defines a fluid pathway, the fluid pathway allowing fluid to flow from the mixing chamber to an outlet of the faucet.

4. The faucet of claim 3, wherein, in a closed position, the main seal is configured to seal the fluid pathway of the first stopper.

5. The faucet of claim 4, wherein the knob is configured to be translated along a longitudinal axis in response to an applied force, and wherein, in an open position, the knob is configured to translate the main shaft in a same longitudinal direction such that the main seal coupled to the main shaft is translated away from the fluid pathway.

6. The faucet of claim 5, wherein, in the open position, the knob is configured to translate the damper assembly in response to the knob making contact with the interference surface of the piston such that the piston moves and biases the second biasing member of the damper assembly.

7. The faucet of claim 6, wherein when the valve assembly is in the open position, the fluid pathway defined by the first stopper fluidly connects the mixing chamber and the outlet.

8. The faucet of claim 7, wherein when transitioning from the open position to the closed position, the damper assembly controls the timing of the fluid flow.

9. The faucet of claim 2, further comprising a second stopper disposed in the dry chamber.

10. The faucet of claim 9, wherein the main shaft is configured to extend through the first stopper and the second stopper.

11. The faucet of claim 9, wherein the outer cylinder of the damper is disposed between the first stopper and the second stopper, and the piston is configured to extend through the second stopper.

12. The faucet of claim 1, wherein the knob is configured to overlap an outer surface of the faucet housing.

13. A faucet system for an aircraft lavatory, the faucet system comprising:
   a potable water source; and
   a faucet, comprising:
      a faucet housing defining an inlet and an outlet, the inlet coupled to the potable water source;
      a valve assembly disposed at least partially within the faucet housing, the valve assembly comprising:
         a main shaft having a first end and a second end;
         a knob coupled to the first end;
         a mixing plate coupled to the second end; and
         a main seal coupled to the main shaft;
      a first damper assembly disposed within the faucet housing, the first damper assembly comprising:
         a first outer cylinder; and
         a first piston extending at least partially into the first outer cylinder; and
      a second damper assembly disposed within the faucet housing, the second damper assembly comprising:
         a second outer cylinder; and
         a second piston extending at least partially into the second outer cylinder.

14. The faucet system of claim 13, further comprising a first stopper disposed within the faucet housing, wherein the first stopper defines a fluid pathway and isolates the damper assembly from fluid received by the inlet, the fluid pathway allowing fluid to flow from the inlet to the outlet of the faucet.

15. The faucet system of claim 14, wherein the inlet comprises a plurality of apertures configured to direct a hot fluid received from the potable water source separately from a cold fluid received from the potable water source.

16. The faucet system of claim 15, wherein the mixing plate is configured to proportion the hot fluid and the cold fluid.

17. The faucet system of claim 14, wherein when the valve assembly is in an open position, the fluid pathway defined by the first stopper fluidly connects the inlet and the outlet.

18. The faucet system of claim 17, wherein the damper assembly controls the timing of the fluid flow when transitioning from the open position to a closed position.

19. The faucet system of claim 18, wherein, in the closed position, the main seal is configured to seal the fluid pathway of the first stopper.

* * * * *